Aug. 22, 1950    P. C. TEMPLE    2,519,798
PRESSURE REGULATING VALVE
Filed March 8, 1945    2 Sheets-Sheet 1

Inventor
PAUL C. TEMPLE
By Albert G. Blodgett
Attorney

Aug. 22, 1950     P. C. TEMPLE     2,519,798
PRESSURE REGULATING VALVE
Filed March 8, 1945     2 Sheets-Sheet 2
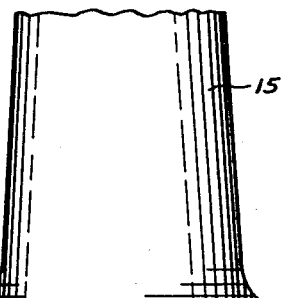
Fig. 3
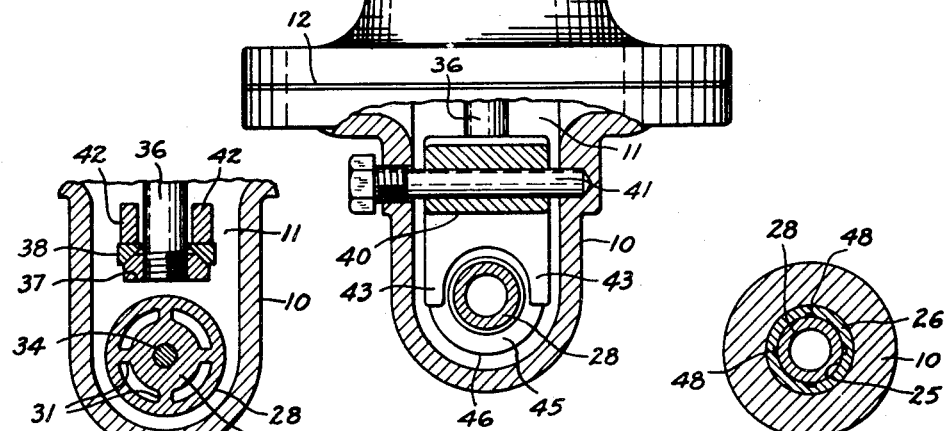
Fig. 4     Fig. 5
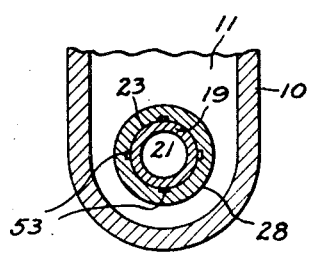
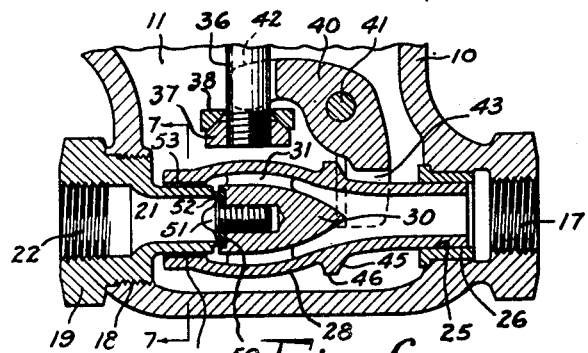
Fig. 7     Fig. 6
Inventor
PAUL C. TEMPLE
By Albert G. Blodgett
Attorney Patented Aug. 22, 1950

2,519,798

UNITED STATES PATENT OFFICE 2,519,798

PRESSURE REGULATING VALVE

Paul C. Temple, Decatur, Ill., assignor to A. W. Cash Company, Decatur, Ill., a corporation of Delaware Application March 8, 1945, Serial No. 581,679

8 Claims. (Cl. 50—26)

This invention relates to pressure regulating valves, and more particularly to valves of the type arranged to regulate the pressure of fluid discharged therefrom. In certain respects the invention may be considered an improvement over the valve disclosed in my United States Reissue Patent No. 19,545, granted April 23, 1935.

It is one object of the invention to provide a pressure regulating valve which will have a large fluid-handling capacity in proportion to the size of the valve.

It is a further object of the invention to provide a pressure regulating valve so constructed and arranged that the various movable parts will operate smoothly and without binding.

It is a further object of the invention to provide a pressure regulating valve of relatively simple and inexpensive construction which will be thoroughly dependable in service.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts, Fig. 1 is a vertical central section through a pressure regulating valve, the section being taken on the line 1—1 of Fig. 2;

Fig. 3 is an elevation of the valve viewed from the discharge side thereof and partially broken away along the line 3—3 of Fig. 1;

Fig. 4 is a section taken on the line 4—4 of Fig. 1;

Fig. 5 is a section taken on the line 5—5 of Fig. 1;

Fig. 6 is a fragmentary view similar to Fig. 1, but showing a slightly modified construction; and Fig. 7 is a section taken on the line 7—7 of Fig. 6.

Figure 1:
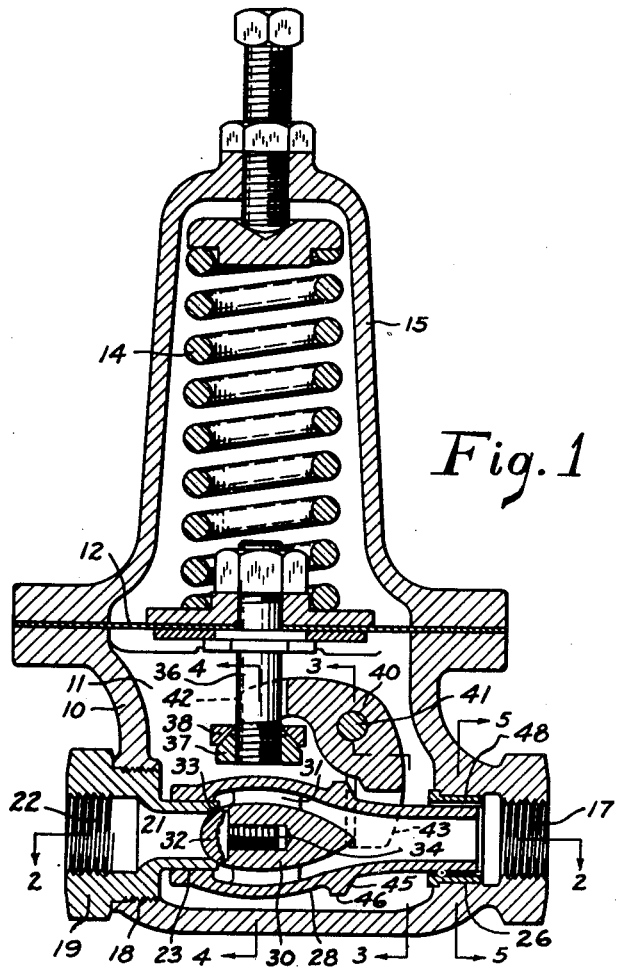

The embodiment illustrated comprises a hollow body or casing 10 shaped to provide a control pressure chamber 11 which is closed at the top by a fluid pressure responsive device in the form of a flexible diaphragm 12. This diaphragm is loaded by means of a coiled spring 14 located within a spring chamber 15, the peripheral portion of the diaphragm being clamped tightly between the flanged top of the body 10 and the flanged bottom of the spring chamber 15. In one side of the body 10 there is provided a threaded outlet opening 17, and in the opposite side of the body there is provided a threaded opening 18 within which there is mounted a bushing 19 having an axial passage 21 therethrough to form a high pressure space. The outer end of the passage 21 is threaded and provides an inlet opening 22 which is directly aligned with the outlet opening 17. The rear portion of the bushing 19 projects into the chamber 11 to form a boss which is provided with an outer cylindrical surface 23 appreciably smaller in diameter than the opening 18. Immediately in front of the outlet 17 there is provided a cylindrical guide opening 25 which is preferably formed by a sleeve 26 firmly pressed into a suitable recess in the body 10.

Fluid is preferably conducted from the high pressure space 21 directly to the outlet 17 by means of a tube 28. The front end of this tube is slidably supported on the outer surface 23 of the rear portion of the bushing 19, and the rear end of the tube is slidably supported within the guide opening 25 of the sleeve 26. In order to control the flow of the fluid, a valve member 30 is mounted within the tube 28 and connected to the surrounding wall of the tube by means of thin radial struts 31, this construction providing a flow passage of annular cross section extending along the tube in surrounding relationship to the valve member. This valve member 30 is preferably of tear-drop or streamlined form to minimize the resistance to the flow. The front end portion 32 of the valve member is adapted to engage an annular valve seat 33 on the rear end of the bushing 19. This end portion 32 is preferably formed in a separate piece fastened to the main body of the valve member by a threaded stud 34.

Fluid pressure acting against the lower surface of the diaphragm 12 is utilized to urge the valve member 30 forwardly toward its closed position. For this purpose a stud 36 is secured to the diaphragm and extends downwardly therefrom into the control pressure chamber 11. On the lower end of this stud there is mounted a nut 37 having a spherical upper surface which supports a washer 38. At the rear of the stud 36 there is provided a bell crank lever 40 which is fulcrumed on a transverse horizontal pin 41, this pin being supported at its opposite ends in the side walls of the body 10, as best shown in Fig. 3. The lever is free to slide laterally along the pin 41 to a limited extent. The front end of the lever 40 is bifurcated to provide two fingers 42 which straddle the stud 36 and engage the top surface of the washer 38. The lower end of the lever 40 is likewise bifurcated to provide two fingers 43 which straddle the tube 28 and are spaced laterally therefrom, these fingers engaging a rearwardly facing annular shoulder or abutment 45 formed on a rib 46 which surrounds the tube.

It is important that the tube 28 should slide freely and without binding during the operation of the valve, and such action is greatly facilitated by supporting the tube at its opposite ends in the manner already described. As a further contribution to free movement of the tube, it is proposed to apply force to the tube by means of the bell crank lever 40 in such a manner that the resultant force will be along the axis of the tube. This may be accomplished by applying two equal forces to the tube at diametrically opposite points thereon. For this purpose the shoulder 45 and the front surfaces of the fingers 43, which engage the shoulder, are so shaped as to produce a substantial equalization of the pressures applied by these two fingers to the shoulder. This equalization may be brought about by sloping the shoulder 45 in a forwardly and outwardly direction, or by sloping the front surfaces of the fingers 43 in a similar manner. In the embodiment illustrated both of these expedients are utilized. It will be understood that if only one of the fingers 43 should engage the shoulder 45, the bell crank lever 40 will slide laterally along the fulcrum pin 41, because of the sloping surfaces of the shoulder and fingers, until the lever is properly aligned with the tube and both fingers are in firm contact with the shoulder.

Figure 2:
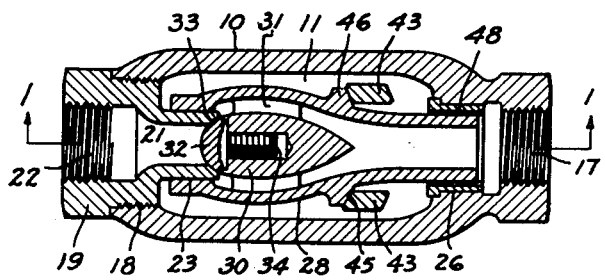
Fig. 2 is a section taken on the line 2—2 of Fig. 1.

The control pressure chamber 11 is exposed to the pressure of the fluid posterior to the valve seat through a passage which is subjected to an aspirating effect produced by the fluid flow. For this purpose a plurality of grooves 48 may be provided in the inner surface of the sleeve 26, as shown in Figs. 1, 2 and 5, these grooves extending lengthwise of the sleeve to connect the chamber 11 with the outlet 17.

In Figs. 6 and 7 a slightly modified construction is disclosed. On the front of the valve member there is mounted a washer 50 of a suitable non-metallic composition, which is held in place by a screw 51. This washer is adapted to engage an annular valve seat 52 on the rear end of the bushing 19. In this modification the sleeve 26 is made without grooves, and the front portion of the tube 28 is provided with a plurality of internal grooves 53 which extend lengthwise thereof to provide the desired aspirating passages. If desired, this arrangement of grooves 53 could be employed in the embodiment shown in Fig. 1, instead of the grooves 48.

The operation of the invention will now be apparent from the above disclosure. Under conditions of zero demand, the fluid pressure at the outlet 17 will be transmitted through the grooves 48 or the grooves 53 (as the case may be) to the control pressure chamber 11, where it is effective on the lower surface of the diaphragm 12 to raise the diaphragm against the force of the spring 14. Through the diaphragm stud 36 and the bell crank lever 40, the tube 28 will be moved to its forward position, with the valve member 30 in its closed position. Upon a demand for fluid, the pressure at the outlet 17 and within the chamber 11 will drop slightly, and the spring 14 will lower the diaphragm 12 and the stud 36, whereupon the high pressure in the space 21 will move the valve member 30 and the tube 28 rearwardly to permit flow through the tube. This flow will aspirate fluid from the grooves 48 or 53 and thus lower the pressure in the chamber 11 below that at the outlet 17, causing the tube 28 to move still further in a rearward direction to provide an increased valve opening. Consequently very little change will take place in the pressure at the outlet 17 despite wide variations in the demand for fluid. Furthermore the valve will have a very large capacity for flow in proportion to its size, for the flow is in substantially a straight line, and when the valve is fully open the streamlined valve member 30 will provide very little resistance to the flow.

Since the tube 28 is slidably supported at both ends, it will operate freely at all times without binding. The valve member will be held in accurate alignment with its seat to ensure tight closure. The bell crank lever 40 is free to move laterally along the fulcrum pin 41, and it will accordingly align itself automatically with the tube 28, with both of the fingers 43 in firm contact with the shoulder 45 of the tube, as shown in Fig. 2. Hence the resultant force applied to the tube will be along its axis, and there will be no lateral pressure to cause friction. The mechanism will operate smoothly and dependably at all times.

Having thus described my invention, what I claim as new and desire to secure by Letters Patent is:

1. A pressure regulating valve comprising a hollow structure providing a control pressure chamber, an outlet opening, a guide opening forming a support in front of the outlet opening, and a hollow boss which projects rearwardly into said chamber toward the guide opening and encloses a high pressure space, a tube arranged to conduct fluid from the high pressure space to the outlet opening, the boss extending into the front end of the tube to provide a support on which the tube may slide axially and the rear end of the tube being slidably supported within the said guide opening, a valve member located within the tube and spaced radially from the inner surface thereof to define a flow passage of annular cross section, a pressure responsive device subjected to the pressure in said control pressure chamber, and mechanical connections from the said device to the tube arranged to slide the tube and valve member axially to regulate the flow from the high pressure space, one of said supports and the adjacent portion of the tube being so shaped and constructed as to form a passage through which fluid is aspirated from the control pressure chamber by the flow through the tube.

2. A pressure regulating valve comprising a hollow structure providing a control pressure chamber, an outlet opening, a guide opening forming a support in front of the outlet opening, and a threaded opening opposite the guide opening and aligned therewith, a bushing mounted in the threaded opening to enclose a high pressure space, the bushing projecting rearwardly into the said chamber and having an annular valve seat on its rear end, a tube arranged to conduct fluid from the high pressure space to the outlet opening, the bushing extending into the front end of the tube to provide a support on which the tube may slide axially and the rear end of the tube being slidably supported within the said guide opening, a valve member located within the tube and spaced radially from the inner surface thereof to define a flow passage of annular cross section, the valve member cooperating with the valve seat to control the flow from the high pressure space, a pressure responsive device subjected to the pressure in said control pressure chamber, and mechanical connections from the said device to the tube arranged to slide the tube and valve member axially, one of said supports and the adjacent portion of the tube being so shaped and constructed as to form a passage through which fluid is aspirated from the control pressure chamber by the flow through the tube.

3. A pressure regulating valve comprising a hollow structure providing a high pressure space, a control pressure chamber, and an outlet opening, an axially slidable tube arranged to provide a conduit for fluid flowing from the high pressure space to the outlet opening, a valve member carried by the tube to control the rate of flow, a pressure responsive device subjected to the pressure in said control pressure chamber, and mechanical connections from the said device to the tube arranged to slide the same, the tube having rearwardly facing abutments in fixed relation thereon and the said connections including a lever having two fingers which straddle the tube and are spaced laterally therefrom while engaging the abutments, the lever being free to move laterally, and the abutments and fingers being so shaped as to move the lever laterally as may be required to equalize the pressures of the fingers on the abutments.

4. A pressure regulating valve comprising a hollow structure providing a high pressure space, a control pressure chamber, and an outlet opening, an axially slidable tube arranged to provide a conduit for fluid flowing from the high pressure space to the outlet opening, a valve member carried by the tube to control the rate of flow, a pressure responsive device subjected to the pressure in said control pressure chamber, and mechanical connections from the said device to the tube arranged to slide the same, the tube having rearwardly facing shoulder portions in fixed relation thereon, the said connections including a pin fixed in the said structure and a lever fulcrumed on the pin and having two fingers which straddle the tube and are spaced laterally therefrom while engaging the shoulder portions, the lever being free to slide along the pin and the shoulder portions being sloped outwardly and forwardly to thereby move the lever along the pin as may be required to equalize the pressures of the fingers on the shoulder portions.

5. A pressure regulating valve comprising a hollow structure providing a high pressure space, a control pressure chamber, and an outlet opening, an axially slidable tube arranged to provide a conduit for fluid flowing from the high pressure space to the outlet opening, a valve member carried by the tube to control the rate of flow, a pressure responsive device subjected to the pressure in said control pressure chamber, and mechanical connections from the said device to the tube arranged to slide the same, the tube having a circumferential rib in fixed relation thereon providing a rearwardly facing annular shoulder, the said connections including a pin fixed in the said structure and a lever fulcrumed on the pin and having two fingers which straddle the tube and are spaced laterally therefrom while engaging the shoulder at diametrically opposite points, the lever being free to slide along the pin and the shoulder flaring outwardly and forwardly to thereby move the lever along the pin as may be required to equalize the pressures of the fingers on the shoulder.

6. A pressure regulating valve comprising a hollow structure providing a high pressure space, a control pressure chamber, and an outlet opening, an axially slidable tube arranged to provide a conduit for fluid flowing from the high pressure space to the outlet opening, a valve member carried by the tube to control the rate of flow, a pressure responsive device subjected to the pressure in said control pressure chamber, and mechanical connections from the said device to the tube arranged to slide the same, the tube having rearwardly facing abutments in fixed relation thereon and said connections including a lever having two fingers which straddle the tube and are spaced laterally therefrom while engaging the abutments, the lever being free to move laterally and the front surfaces of the fingers flaring outwardly and forwardly to thereby move the lever along the pin as may be required to equalize the pressures of the fingers on the abutments.

7. A pressure regulating valve comprising a hollow structure providing a high pressure space, a control pressure chamber, and an outlet opening, an axially slidable tube arranged to provide a conduit for fluid flowing from the high pressure space to the outlet opening, a valve member carried by the tube to control the rate of flow, a pressure responsive device subjected to the pressure in said control pressure chamber, and mechanical connections from the said device to the tube arranged to slide the same, the tube having rearwardly facing abutments in fixed relation thereon, the said connections including a pin fixed in said structure and a lever fulcrumed on the pin and having two fingers which straddle the tube and are spaced laterally therefrom while engaging the abutments at diametrically opposite points, the lever being free to slide along the pin and the front surfaces of the fingers flaring outwardly and forwardly to thereby move the lever along the pin as may be required to equalize the pressures of the fingers on the abutments.

8. A pressure regulating valve comprising a hollow structure providing a high pressure space, a control pressure chamber, and an outlet opening, a tube arranged to conduct fluid from the high pressure space to the outlet opening, means adjacent each end of the tube supporting the same for axial sliding movement, a valve member located within the tube to control the rate of flow and spaced radially from the inner surface of the tube to define a flow passage of annular cross section, a pressure responsive device subjected to the pressure in said control pressure chamber, and mechanical connections from the said device to the tube arranged to slide the tube and the valve member, the tube having rearwardly facing abutments in fixed relation thereon the said connections including a lever having two fingers thereon which straddle the tube and are spaced laterally therefrom while engaging the abutments at diametrically opposite points, the lever being free to move laterally, and the fingers and abutments having contacting surfaces so shaped as to bring about any lateral movement of the lever required to equalize the pressures of the fingers on the abutments.

PAUL C. TEMPLE.

REFERENCES CITED

The following references are of record in the file of this patent:

UNITED STATES PATENTS

| Number | Name | Date |
|---|---|---|
| 1,885,389 | Temple (a) | Nov. 1, 1932 |
| 1,934,832 | Temple (b) | Nov. 14, 1933 |
| 2,133,983 | Gaston | Oct. 25, 1938 |
| 2,302,175 | Bowen | Nov. 17, 1942 |

FOREIGN PATENTS

| Number | Country | Date |
|---|---|---|
| 590,834 | France | Mar. 26, 1925 |